3,595,859
5-ARYLOTRIAZOLYL-2-STYRYL-BENZOTRIAZOLES
Carl-Wolfgang Schellhammer, Opladen, and Wolf-Dieter Wirth, Cologne-Stammheim, Germany, assignors to Farbenfabriken Bayer Aktiengesellschaft, Leverkusen, Germany
No Drawing. Filed Apr. 8, 1968, Ser. No. 719,722
Claims priority, application Germany, Apr. 17, 1967, F 52,141
Int. Cl. C07d 55/04
U.S. Cl. 260—240          7 Claims

ABSTRACT OF THE DISCLOSURE

The invention involves new 5-arylotriazolyl 2-styryl benzotriazoles of the formula

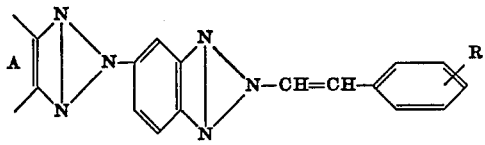

which are useful as optical brightening agents. In the formula R is hydrogen, alkyl, alkoxy, carbalkoxy, acylamino, alkyl sulphonyl, carboxy, CN, an ammonium group, a hydrazinium group or halo, and A stands for the residual members of a mono- or polynuclear aromatic-carbocyclic ring system which is condensed as indicated with the heterocyclic ring and which may contain further substituents, whereas $n$ denotes the numbers 1–3. The various R substituent groups may themselves be further substituted, the preferred substituents on the alkyl groups being OH, CN, halo, alkoxy, carbalkoxyl and carboxyl groups.

---

The object of the present application comprises valuable new 5-arylotriazolyl-2-styryl-benzotriazoles of the formula

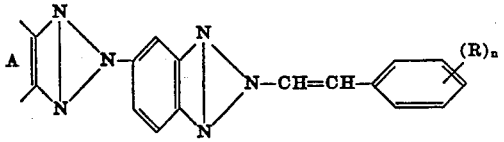

which are eminently suitable as brightening agents. In the general formula, R stands for hydrogen or a substituent, for example, an alkyl group, an alkoxy group, a carbalkoxy group, an acylamino group, an alkylsulphonyl group, a carboxyl group, a CN-group, an ammonium group, a hydrazinium group, or halogen, and A stands for the residual members of a mono- or polynuclear aromatic-carbocyclic ring system which is condensed as indicated with the heterocyclic ring and which may contain further substituents, whereas $n$ denotes the numbers 1–3. The alkyl, alkoxy, carbalkoxy, acylamino and alkylsulphonyl groups may be further substituted, the preferred substituents in the case of alkyl groups being OH, CN, halogen, such as Cl and Br, alkoxy groups, carbalkoxy groups and carboxyl groups. Suitable alkyl radicals R are, for example, $CH_3$, $C_2H_5$, n—$C_3H_7$, n—$C_4H_9$, iso—$C_4H_9$ and tert.—$C_4H_9$; suitable alkoxy radicals R are, for example, $OCH_3$, $OC_2H_5$ and $OC_4H_9$. Examples of carbalkoxy groups R are the radicals —$COOCH_3$, —$COOC_2H_5$ and —$COOC_4H_9$. Suitable halogen radicals are, in particular, Cl and Br, suitable acylamino radicals are mainly formylamino, alkylcarbonylamino, arylcarbonylamino, aralkylcarbonylamino, alkylsulphonylamino, arylsulphonylamino and aralkylsulphonylamino radicals, for example the radicals —$NHCOCH_3$, —$NHCOC_2H_5$, —$NHCOC_3H_7$, —$NHSO_2CH_3$, —$NHSO_2C_6H_5$ and

—$NHSO_2C_6H_4CH_3$

Suitable alkylsulphonyl radicals R are, for example, —$SO_2CH_3$, —$SO_2C_2H_5$ and —$SO_2C_3H_7$.

Suitable ammonium radicals are, for example, trialkylammonium radicals, such as

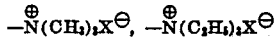

suitable hydrazinium radicals are, for example,

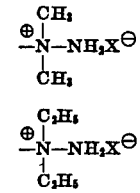

where $X^\ominus$ stands for an anion, for example, for $Cl^\ominus$, $Br^\ominus$, $CH_3OSO_3^\ominus$, $C_2H_5OSO_3^\ominus$ $C_6H_5SO_3^\ominus$ or $CH_3C_6H_4SO_3^\ominus$ The term fused mono- or polynuclear aromatic-carbocyclic ring systems comprises, in particular, optionally substituted phenylene, naphthylene or acenaphthylene radicals, the preferred substituents being alkyl and/or alkoxy groups and/or acylamino groups and/or dialkylamino groups. Suitable alkyl, alkoxy and acylamino groups are those mentioned above in the definition of R, suitable dialkylamino groups are especially those the alkyl radicals of which contain 1–4 carbon atoms.

Preferred compounds are those of the formula

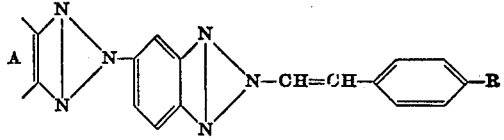

wherein R and A have the meaning given above.

The new 5-arylotriazolyl-2-styryl-benzotriazoles can be obtained by triazolisation of o-aminoazo-styryl-benzotriazoles of the formula

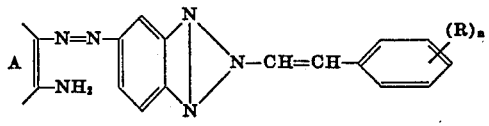

in which A stands for the residual members of a mono- or polynuclear aromatic-carbocyclic ring system which is fused in the indicated manner with the heterocyclic ring and which may contain further substituents; R stands for hydrogen or a substituent and $n$ denotes the numbers 1–3.

If desired, the substituents R or the substituents present in the fused mono- or polynuclear aromatic-carbocyclic ring systems may be further modified after triazolisation; for example, a dialkylamino group may be converted into a quaternary ammonium group or a carboxyl group into an ester group.

Triazolisation is carried out in known manner, for example, by oxidation with copper(II) salts, if desired, in the presence of air or with sodium hypochlorite.

The o-aminoazo-styryl-benzotriazoles of the Formula II can be obtained, for example, by reacting chloroacetic acid with 5-nitro-benzotriazole in water, in the presence of alkali, at an elevated temperature to form 5-nitrobenzotriazole-2-acetic acid, further reaction with aromatic aldehydes in the presence of catalytic amounts of piperidine at 120–200° C. to form 5-nitro-2-styryl-benzotriazoles and subsequent reduction to 5-amino-2-styryl-benzotriazoles of the formula

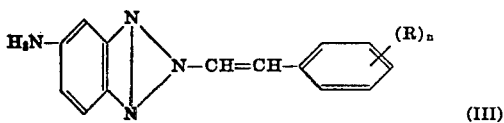

in which R and n have the same meaning as above, diazotisation and coupling with mono- or polynuclear primary aroamtic-carbocyclic amines which couple in the o-position to the NH$_2$-group.

Suitable aromatic aldehydes for the preparation of the 5-nitro-2-styryl-benzotriazoles are, for example, benzaldehyde, p-methylbenzaldehyde, p-tert.-butyl-benzaldehyde, p-methylsulphonyl-benzaldehyde, p-dimethylamino-benzaldehyde, p-cyano-benzaldehyde, p-carboxy-benzaldehyde, p-carbethoxy-benzaldehyde, p-chloro-benzaldehyde, p-bromo-benzaldehyde, 2-chlorobenzaldehyde, 2-methoxy-benzaldehyde, 2,4-dichloro benzaldehyde, 2,4,5-trichlorobenzaldehyde and 4-acetylamino benzaldehyde.

Mono- or polynuclear primary aromatic-carbocyclic amines which are suitable coupling components for the preparation of the o-aminoazo compounds are, for example, m-phenylene-diamine,
N,N-dimethyl-m-phenylene-diamine,
4-amino-2-methoxy-toluene,
4-amino-2-n-butoxy-toluene,
4-amino-2-n-dodecyloxy-toluene,
2-amino-naphthalene,
2-amino-6-methoxy-naphthalene and
5-amino-acenaphthene.

The new products of the Formula I are valuable blue-fluorescent brightening agents. The object of the invention, therefore, also comprises brightening agents containing 5-arylotriazolyl-2-styryl-benzotriazoles according to Formula I as active ingredient.

Compounds which are particularly suitable as brightening agents are those of the formulae

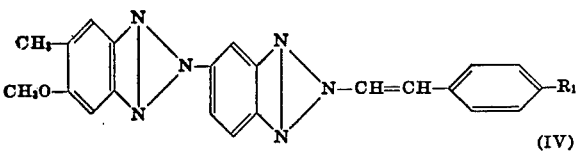

(IV)

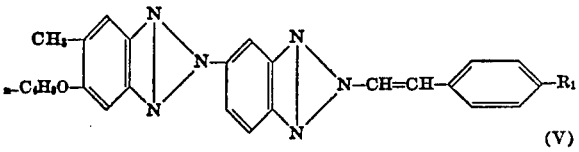

(V)

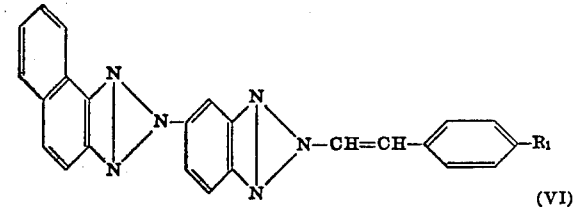

(VI)

in which R$_1$ stands for hydrogen, an alkyl, alkoxy or ammonium group, especially a group CH$_3$, OCH$_3$ or

where X$^\ominus$ denotes an anion.

The new compounds of the Formula I are especially suitable for the brightening of synthetic materials, such as the brightening of fibres, filaments, fabrics, foils or plastic materials of aromatic polyesters, such as polyethylene glycol terephthalates and aromatic polyesters obtained from terephthalic acid and 1,4-bis-hydroxymethyl-cyclohexane, of polymers and copolymers based on acrylonitrile or as.-dicyanoethylene, polyvinyl chloride, cellulose 2½-acetate, and cellulose triacetate, and for the brightening of lacquers of cellulose acetates. Application of the brightening agents which contain the compounds of the Formula I in pure form or mixed with other suitable additives, is carried out in the usual manner, for example, in the form of aqueous dispersions or in the form of solutions in organic solvents, such as acetone, ethyl acetate, glycol monomethyl ether acetate, methylene chloride or toluene. If desired, the brightening agents can be applied in combination with detergents or they may be added to casting materials serving for the production of foils or filaments.

The amounts of compounds of the Formula I required for the application of a brightening agent can easily be established in every case by preliminary experiments. In general, amounts of 0.1 to 0.5%, referred to the material to be brightened, will prove sufficient.

With the new products used as brightening agents, eminently clear white shades, very good fastness to light and, in particular, a high fastness to chlorite can be achieved on the materials thus brightened.

The parts given in the examples are parts by weight, the percentages are percent by weight.

EXAMPLE 1

Fabrics of polyethylene terephthalate fibres, which have a yellowish appearance, are washed at 75° C. with a commercial detergent containing about 20% of synthetic surface-active substances and, if desired, complex phosphates, sodium silicate, carboxymethyl cellulose, as well as sodium perborate and, in addition, 0.2% 5-(naphtho-[2,1-d]-triazolyl-2')-styryl-benzotriazole. After rinsing and drying, the laundry goods have a bright white appearance.

The 5-(naphtho-[2,1-d]-triazolyl-2')-2-styryl-benzotriazole used above is prepared in the following manner:

19.4 g. of the o-aminoazo dyestuff obtained from diazotised 5-amino-2-styryl-benzotriazole and β-naphthylamine are heated in 300 ml. pyridine containing 20 g. of copper(II)-acetate at boiling temperature for 1 hour while stirring. After cooling, the precipitated product is filtered off with suction, washed with some alcohol and recrystallised from dimethyl formamide or glacial acetic acid. Small pale yellow crystals are obtained which melt at 197° C.

The o-aminoazo dyestuff was obtained as follows:

The 5-nitro-2-styryl-benzotriazole which can be obtained by condensation of 5-nitro-benzotriazole with chloroacetic acid to form 5-nitro-benzotriazole-2-acetic acid, followed by condensation with benzaldehyde in the presence of piperidine at 160–170° C., is catalytically reduced to 5-amino-2-styryl-benzotriazole of melting point 154–156° C.

11.8 g. (0.05 mole) 5-amino-2-styryl-benzotriazole are diazotised in a hydrochloric acid solution at 0° C. with 3.5 g. (0.05 mole) sodium nitrite. The diazotisation mixture is subsequently added to a solution of 7.2 g. (0.05 mole (β-naphthylamine in 100 ml. glacial acetic acid, mixed with 20 g. of crystalline sodium acetate and stirred at 20° C. for several hours. A red dyestuff is thus precipitated, which is filtered off with suction, washed with water and dried.

When the o-aminoazo-styryl-benzotriazoles obtained by coupling diazotised 5-amino-2-styryl-benzotriazole with 2-methoxy-4-aminotoluene or 2-n-butoxy-4-aminotoluene are oxidised in the manner described above, then there are obtained 5-[5'-methyl-6'-methoxy-benzotriazolyl-2']-styryl-benzotriazole of melting point 222–223° C. and 5-[5'-methyl-6'-butoxy-benzotriazolyl-2']-styryl-benzotriazole of melting point 151–153° C., respectively.

EXAMPLE 2

A fabric of polyester fibres is introduced in a liquor ratio of 1:40 into a bath containing, per litre, 1.5 g. oleyl sulphonate, 0.75 g. formic acid and 0.1 g. 5-(naphtho-[2,1-d]-triazolyl-2')-2-(p - methyl - styryl)-benzotriazole; the bath is then heated to boiling point within 30 minutes and held at boiling temperature for about 45 minutes, while the fabric is moderately agitated in the bath. The fabric is subsequently rinsed and dried. The fabric is then excellently brightened.

The brightening agent used above is prepared in the following manner:

The o-amioazo-styryl-benzotriazole which can be obtained by coupling 1 mole of diazotised 5-amino-2-(p-methyl-styryl)-benzotriazole with 1 mole β-naphthylamine is oxidised as described in Example 1, whereby clear yellowish crystals of melting point 211–223° C. are obtained.

The 5-amino-2-(p-methyl-styryl)-benzotriazole used as starting material is obtained as follows:

345 g. 5-nitro-benzotriazole-2-acetic acid, prepared according to Example 1, were condensed at 150–165° C. for 5 hours in the presence of catalytic amounts of piperidine with 200 g. p-methyl-benzaldehyde. The 5-nitro-2-(p-methyl-styryl)-benzotriazole of melting point 213° C. thus obtained is reduced with tin(II)-chloride in glacial acetic acid to 5-amino-2-(p - methyl - styryl) - benzotriazole of melting point 169–171° C. The diazotisation was carried out as described in Example 1.

EXAMPLE 3

A fabric of cellulose acetate fibres is introduced in a liquor ratio of 1:40 at 60° C. into an aqueous bath containing, per litre, 1 g. oleyl sulphonate, 0.95 g. formic acid and 0.075 g. 5-(naphtho-[2,1-d]-triazolyl-2')-2-(p-methoxy-styryl)-benzotriazole. After 45 minutes, the fabric is rinsed and dried. It is well brightened.

The brightening agent used above is prepared in the following manner:

The 5-nitro-2-(p-methoxy-styryl)-benzotriazole of melting point 239–241° C. which can be obtained by condensation of 5-nitro-benzotriazole-2-acetic acid with 4-methoxy-benzaldehyde is reduced in butanol with iron powder/hydrochloric acid to 5-amino-2-(p-methoxy-styryl)-benzotriazole. 0.05 mole of the amine so obtained are diazotised as described in Example 1, coupled with 0.05 mole β-naphthylamine and subsequently oxidised with copper(II)-acetate in pyridine to form 5-(naphtho-[2,1-d]-triazolyl-2')-2-(p-methoxystyryl)-benzotriazole of melting point 188–190° C.

EXAMPLE 4

65 g. polyvinyl chloride with a K-value of 72–74, 35 g. dioctyl-phthalate, 2 g. of a commercial organic tin compound serving for stabilisation of the polyvinyl chloride, 1 g. titanium dioxide (rutile), and 0.1 g. of one of the brightening agents mentioned in Example 1, are rolled on a hot roll with low friction at about 165–170° C. for 5 minutes; the rough sheet so obtained is then drawn off on a four-roll calender to produce a foil of about 300μ thickness. The foil is excellently brightened.

We claim:
1. 5-benzotriazolyl-2-styryl-benzotriazole of the formula

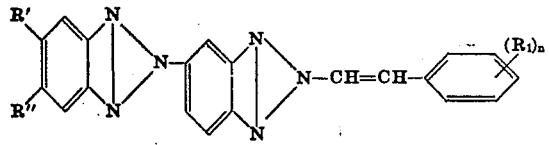

in which $R_1$ stands for hydrogen, lower alkyl, lower alkoxy or ammonium or tri lower alkyl ammonium, R' is lower alkyl and R" is lower alkoxy and n is a number from 1 to 3.

2. 5-arylotriazolyl-2-styryl-benzotriazole of the formula

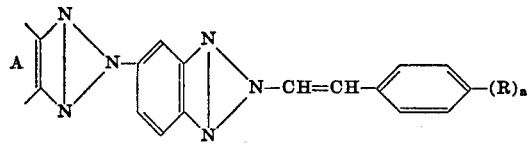

in which R stands for hydrogen or a member selected from the group consisting of lower alkyl; lower alkoxy; carb lower alkoxy; acylamino selected from the group consisting of NHXR$_2$ wherein X is CO or SO$_2$ and R$_2$ is lower alkyl, hydrogen, phenyl, or tolyl; lower alkyl sulphonyl; carboxyl; cyano; ammonium; tri lower alkyl ammonium; hydrazinium; di lower alkyl hydrazinium; halogen, wherein the alkyl groups of the said substituent may contain substituents selected from the group consisting of hydroxy, cyano, halogen, lower alkoxy, carbo lower alkoxy and carboxyl group; a denotes a member selected from the group consisting of phenylene, naphthylene, and acenaphthylene wherein the said member A may contain substituents selected from the group consisting of lower alkyl; lower alkoxy; acylamino selected from the group consisting of NHXR$_2$ wherein X is CO or SO$_2$ and R$_2$ is lower alkyl, hydrogen, phenyl, or tolyl; and di lower alkyl amino wherein the alkyl groups of these substituents may further contain substituents selected from the group consisting of hydroxy, cyano, halogen, lower alkoxy, carbo lower alkoxy and carboxyl groups; and wherein n stands for a number from 1 to 3.

3. 5-naphthotriazolyl-2-styryl-benzotriazole of the formula

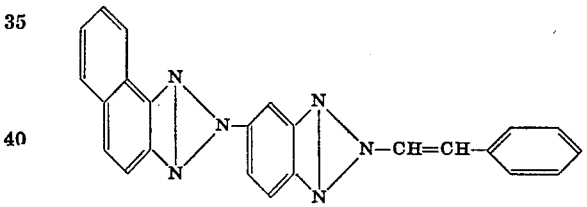

4. 5-(5'-methyl-6' - n - butoxy - benzotriazolyl - 2 - (p-methyl-styryl)-benzotriazole of the formula

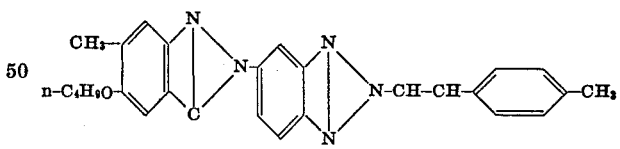

5. 5-(5'-methyl - 6' - methoxy-benzotriazolyl) - 2 - (p-methoxystyryl)-benzotriazole of the formula

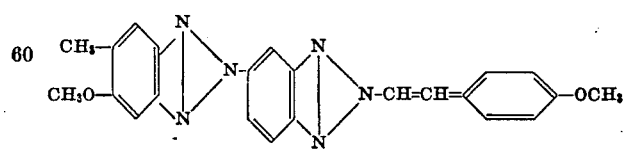

6. 5-arylotriazolyl-2-styryl-benzotriazole of claim 2 of the formula

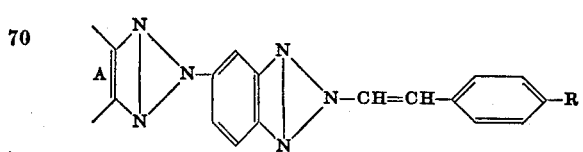

7. 5-naphthotriazolyl-2-styryl-benzotriazole of claim 2 of the formula

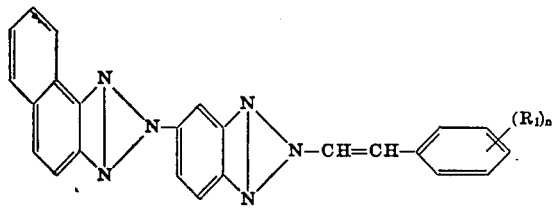

in which $R_1$ stands for hydrogen, an alkyl, alkoxy or ammonium group and in which the naphthalene radical may be substituted as stated in claim 2 wherein $n$ stands for the number 1–3.

References Cited

UNITED STATES PATENTS

| | | | |
|---|---|---|---|
| 2,462,405 | 2/1949 | Keller et al. | 260—240X |
| 2,715,630 | 8/1955 | Sartori | 260—304 |

FOREIGN PATENTS

| | | | |
|---|---|---|---|
| 1,456,745 | 9/1966 | France | 260—240 |

OTHER REFERENCES

Chemical Abstracts, vol. 58, cols. 3077 to 3078 (1963).

JOHN D. RANDOLPH, Primary Examiner

U.S. Cl. X.R.

106—176; 117—33.5; 252—102, 301.2; 260—75, 88.7, 92.8, 157, 240.9